Patented Dec. 7, 1926.

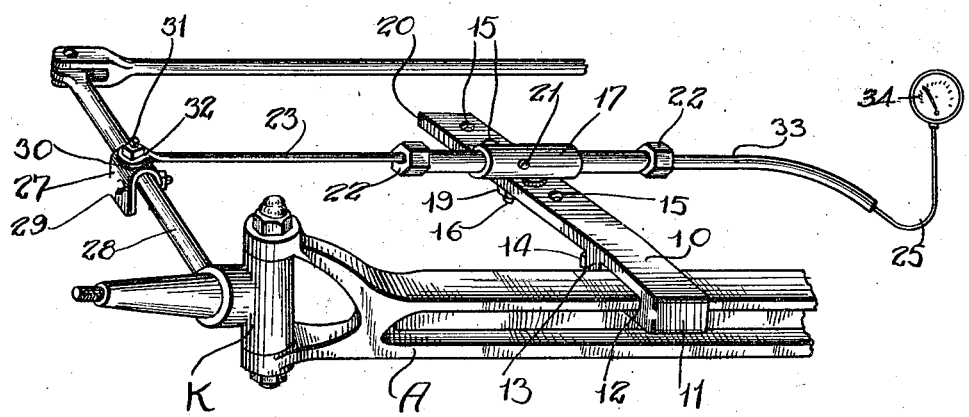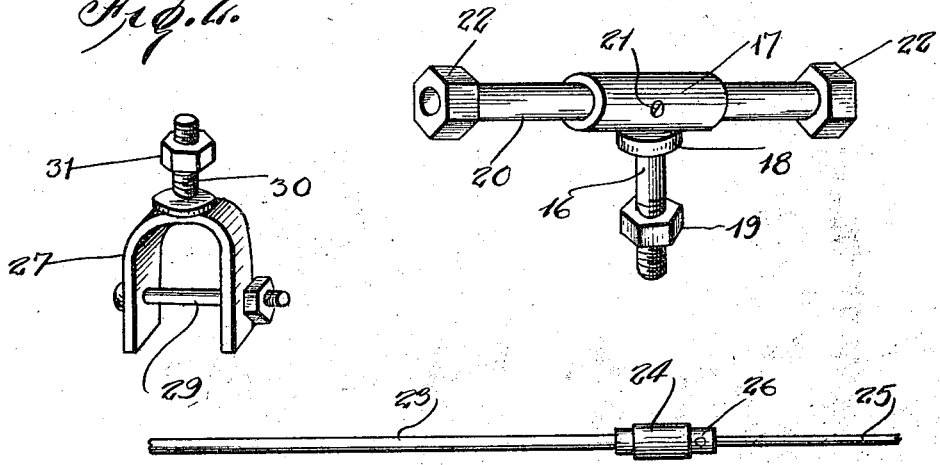

1,609,392

UNITED STATES PATENT OFFICE.

GERHARD VINNEMEIER, OF IOLA, KANSAS.

STEERING-WHEEL INDICATOR.

Application filed April 16, 1926. Serial No. 102,551.

This invention relates to devices for indicating the position of the guiding wheels of an automobile or other like vehicle, such guiding wheels usually being the front wheels of the vehicle. The invention thus may be concisely called a front wheel position indicator.

More particularly the invention relates to the meter actuating mechanism for such indicators, being an improvement over the mechanism for the same purpose shown and described in my prior Patent No. 1,526,260.

One important object of the invention is to provide a simplified and improved construction of the meter actuating mechanism shown in said prior patent.

A second important object of the invention is to provide improved means for attaching the meter operating parts to the steering knuckle arm of an automobile.

A third important object of the invention is to provide an improved means of supporting the device from the front axle of an automobile.

A fourth important object of the invention is to so improve the device as to make it cheaper and more easy to manufacture, more readily to install and less liable to become disarranged.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view of a part of the front axle of an automobile showing one of the steering knuckles and the device attached thereto.

Figure 2 is a view to enlarged scale of a certain saddle bolt used herewith.

Figure 3 is a similar view of a certain guide and tube support used herewith.

Figure 4 is a view showing the actuating rod with the Bowden wire attached thereto.

Figure 5 is a cross section through the front axle showing part of the supporting bracket for the sleeve.

The invention is here shown in connection with the front axle A and one of the steering knuckles K of an automobile.

The invention itself includes a bracket consisting of a bar 10 having one end extended downwardly as at 11 and rearwardly to form a lip 12, this arrangement being such that the lip 12 may hook under the upper flange of the I-beam axle A. To the rear of this end there depends from the bar a lug 13 having a threaded opening wherein is screwed a clamping bolt or stud 14, this bolt being positioned to engage beneath the rear upper flange of the axle A. In the rear of the bar 10 there is provided a series of spaced openings 15 in a selected one of which is positioned a stem 16 projecting downwardly from a sleeve 17 preferably termed the outer sleeve. This stem 16 is provided at its upper end with a collar 18 and has its lower end threaded for the reception of a nut 19 by means of which it is held from accidental displacement from the opening 15 wherein it is engaged. The sleeve is thus pivotally supported in selected position on the rear end of the bar 10. It is obvious that the sleeve may be either above the bar as shown or below the bar. Slidably mounted in this sleeve is an inner sleeve 20 which is held in adjusted relation with respect to the outer sleeve by a set screw 21. At each end of the inner sleeve is a cap nut 22 and through one of these cap nuts there extends a rod 23 which has a head 24 on its inner end and is provided with an axial opening to receive one end of a Bowden wire 25, the latter being secured to the rod by a set screw 26.

At 27 is a saddle or yoke which is adapted to straddle the steering or knuckle arm 28 and which has a clamping bolt 29 extending through its sides so that tightening the bolt draws the sides toward each other and clamps the saddle securely to the arm 28. From the top of this saddle extends upwardly a pivot pin 30 having a nut 31 and on this pin is received an eye 32 which is formed on the end of the rod 23. Thus any movement of the knuckle K causes the plunger rod 23 to move correspondingly in the sleeve 20.

The other cap nut 22 has one end of a flexible tube 33 fixedly connected thereto and through this tube leads the Bowden wire 25, both tube and wire extending to an indicator or meter shown in outline at 34. Preferably both of these cap nuts also constitute packing glands so that each end of the sleeve 20 is packed against the entry of dirt and dust and against loss of lubricant.

The meter or indicator used is preferably similar to the form shown in my prior Patent No. 1,564,649.

With this arrangement attached each position of the front wheels will be at once indicated by the meter, the plunger rod and Bowden wire transmitting the movements of the steering knuckle to the hand of the meter.

It is to be noted that the construction herein shown and described is of very simple nature and the device, being capable of adjustment, may be applied to any of the usual types of automobiles without the use of skilled labor.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a bracket adapted for attachment to a fixed part of an automobile, a guide sleeve pivotally mounted on said bracket, a plunger rod having one end received in said sleeve and movable longitudinally of the sleeve, a yoke member pivoted to the outer end of the rod and adapted for attachment to a steering knuckle arm of the automobile, and a Bowden wire attached to the plunger rod and attachable to the moving part of an indicator.

2. In a device of the kind described, a bracket adapted for attachment to a fixed part of an automobile, an outer sleeve having a pivot stem selectively positionable along said bracket, an inner sleeve slidably adjustable in the outer sleeve, means to hold the inner sleeve in adjusted position, a plunger rod extending into the inner sleeve at one end and movable longitudinally of the sleeve, a Bowden wire fixed to the inner end of said rod and extending from the remaining end of the sleeve for attachment to the moving part of the indicator, an eye on the remaining end of the plunger rod, a pivot extending through said eye, a yoke supporting said pivot and adapted to straddle a steering knuckle arm of the automobile, and a clamp bolt passing through the arms of the yoke to clamp the yoke in adjusted position on the steering knuckle arm.

3. In a device of the kind described, a bracket adapted for attachment to a fixed part of an automobile, an outer sleeve having a pivot stem selectively positionable along said bracket, an inner sleeve slidably adjustable in the outer sleeve, means to hold the inner sleeve in adjusted position, a plunger rod extending into the inner sleeve at one end and movable longitudinally of the sleeve, a Bowden wire fixed to the inner end of said rod and extending from the remaining end of the sleeve for attachment to the moving part of an indicator, an eye on the remaining end of the plunger rod, a pivot extending through said eye, a yoke supporting said pivot and adapted to straddle a steering knuckle arm of the automobile, a clamp bolt passing through the arms of the yoke to clamp the yoke in adjusted position on the steering knuckle arm, packing gland nuts on the ends of the inner sleeve through which the rod and Bowden wire pass, and a guide tube for the Bowden wire having one end attached to one of said nuts and the other end attachable to the indicator.

In testimony whereof I affix my signature.

GERHARD VINNEMEIER.